US012432812B2

(12) United States Patent
Karampatsis et al.

(10) Patent No.: US 12,432,812 B2
(45) Date of Patent: Sep. 30, 2025

(54) CONFIGURING DISCONTINUOUS RECEPTION FOR PC5 INTERFACE

(71) Applicant: Lenovo (Singapore) Pte. Ltd., New Tech Park (SG)

(72) Inventors: Dimitrios Karampatsis, Ruislip (GB); Prateek Basu Mallick, Dreieich (DE)

(73) Assignee: Lenovo (Singapore) Pte. Ltd., Singapore (SG)

(*) Notice: Subject to any disclaimer, the term of this patent is extended or adjusted under 35 U.S.C. 154(b) by 372 days.

(21) Appl. No.: 18/030,043

(22) PCT Filed: Oct. 1, 2021

(86) PCT No.: PCT/IB2021/059063
§ 371 (c)(1),
(2) Date: Apr. 3, 2023

(87) PCT Pub. No.: WO2022/070166
PCT Pub. Date: Apr. 7, 2022

(65) Prior Publication Data
US 2023/0422341 A1 Dec. 28, 2023

Related U.S. Application Data

(60) Provisional application No. 63/086,485, filed on Oct. 1, 2020.

(51) Int. Cl.
*H04W 76/28* (2018.01)
*H04W 28/02* (2009.01)
*H04W 52/02* (2009.01)

(52) U.S. Cl.
CPC ....... *H04W 76/28* (2018.02); *H04W 28/0268* (2013.01); *H04W 52/0216* (2013.01)

(58) Field of Classification Search
CPC ............. H04W 76/28; H04W 28/0268; H04W 52/0216; H04W 76/23; H04W 4/40; H04W 92/18; Y02D 30/70
See application file for complete search history.

(56) References Cited

PUBLICATIONS

Lenovo Motorola Mobility Solution for Key Issue#1 for applying PC5 Drx configuration (Year: 2020).*
PCT/IB2021/059063, "Notification of Transmittal of the International Search Report and the Written Opinion of the International Searching Authority, or the Declaration", International Searching Authority, Feb. 27, 2023, pp. 1-12.

(Continued)

*Primary Examiner* — Ayanah S George
(74) *Attorney, Agent, or Firm* — Kunzler Bean & Adamson

(57) ABSTRACT

Apparatuses, methods, and systems are disclosed for supporting power saving for V2X communications. One apparatus includes a transceiver and a processor that receives a first request from a first application to send data over a PC5 interface. The processor determines a first PC5 DRX configuration for the first application based on at least one first QoS requirement and determines to establish a first PC5 QoS Flow to transmit the data. The processor associates the first PC5 DRX configuration with the first PC5 QoS Flow and sends a second request to an AS layer to establish a first QoS Flow, where the second request indicates a first QoS parameter and the first PC5 DRX configuration.

15 Claims, 7 Drawing Sheets

(56) References Cited

PUBLICATIONS

Qualcomm Inc. et al., "New Solution: QoS aware power efficient PC5 communication", Sa WG2 Meeting #139E (e-meeting) S2-2004714, Jun. 1-12, 2020, pp. 1-4.
Nokia et al., "KI#1, new solution: PC5 DRX configuration for QoS-aware and power-efficient communication", SA WG2 Meeting #140e S2-2006597, Aug. 19-Sep. 2, 2020, pp. 1-5.
Lenovo et al., "Solution for Key Issue #1: Solution for applying PC5 DRX configuration for pedestrian UEs", 3GPP TSG-SA WG2 Meeting #140e S2-2006599, Aug. 19-Sep. 1, 2020, pp. 1-6.
3GPP, 3rd Generation Partnership Project; Technical Specification Group Services and System Aspects; Study on architecture enhancements for 3GPP support of advanced Vehicle-to-Everything (V2X) services; Phase 2 (Release 17), 3GPP TR 23.776 V0.2.0, Sep. 2020, pp. 1-25.
3GPP, "3rd Generation Partnership Project; Technical Specification Group Services and System Aspects; Service requirements for V2X services; Stage 1 (Release 16)", 3GPP TS 22.185 V16.0.0, Jul. 2020, pp. 1-14.
3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.
3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.3.0, Jul. 2020, pp. 1-57.

\* cited by examiner

CONFIGURING DISCONTINUOUS RECEPTION FOR PC5 INTERFACE

CROSS-REFERENCE TO RELATED APPLICATIONS

This application claims priority to U.S. Provisional Patent Application No. 63/086,045 entitled "SUPPORTING POWER SAVING FOR V2X COMMUNICATIONS ON PER PC5 QOS FLOW BASIS" and filed on Oct. 1, 2020 for Dimitrios Karampatsis and Prateek Basu Mallick, which application is incorporated herein by reference.

FIELD

The subject matter disclosed herein relates generally to wireless communications and more particularly relates to power saving for sidelink communications by configuring a Discontinuous Reception ("DRX") configuration for the sidelink interface.

BACKGROUND

In certain networks, Vehicle-to-everything ("V2X") communication allows vehicles to communicate with moving parts of the traffic system around them. V2X is a form of device-to-device ("D2D") communication that uses the PC5 interface. In some embodiments, V2X communication supports sidelink communication over PC5 between a vehicle-based User Equipment ("UE") and a pedestrian UE.

BRIEF SUMMARY

Disclosed are procedures for supporting power saving for V2X communications. Said procedures may be implemented by apparatus, systems, methods, or computer program products.

One method of a User Equipment ("UE") for supporting power saving for V2X communications includes receiving a first request from a first application to send data over a PC5 interface and determining a first PC5 Discontinuous Reception ("DRX") configuration for the first application based on at least one first Quality of Service ("QoS") requirement. The first method includes determining to establish a first PC5 QoS Flow to transmit the data and associating the first PC5 DRX configuration with the first PC5 QoS Flow. The first method includes sending a second request to an Access Stratum ("AS") layer to establish a first QoS Flow, where the second request indicates a first QoS parameter and the first PC5 DRX configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
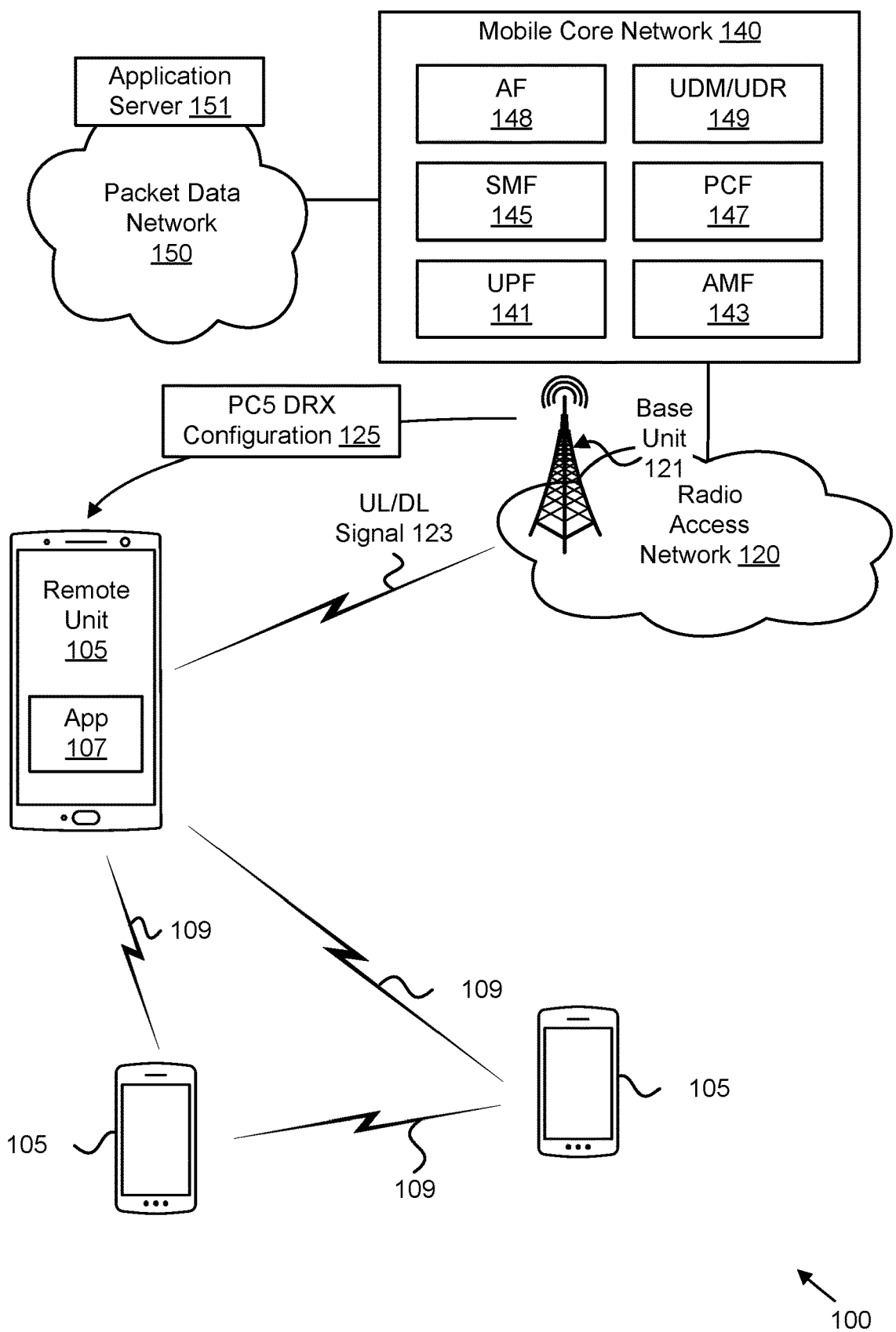
FIG. 1 is a block diagram illustrating one embodiment of a wireless communication system for supporting power saving for V2X communications.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for supporting power saving for V2X communications. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Currently a V2X UE transmits a message for sidelink communication over PC5 at a constant rate. For example, a CAM (Cooperative Awareness Message) message is sent over PC5 every 100 ms. Such constant operation reduces the power efficiency of the UE. One class of V2X UEs (e.g., vehicles or Road Side Units ("RSUs")) has sufficient battery capacity to allow such constant operation and thus are not inconvenienced by transmitting and/or receiving V2X messages at a constant rate. On the other hand, another class of V2X UEs (e.g., smartphones, smart watches) have limited battery capacity or radio resources available and thus a new mechanism is required to ensure power efficient operation over PC5. One mechanism to support power efficient sidelink communication is the DRX (Discontinuous Reception) mechanism defined over Uu to communication over PC5.

Described herein are solutions relating to how a V2X UE determines to apply DRX over PC5 based on the DRX configuration receiving from the network. Also described herein are solutions relating to how the AS layer in the UE receives PC5 DRX configuration and determines the PC5 DRX to apply.

Disclosed are procedures for supporting power saving for V2X communications. The V2X layer in the UE determines the PC5 DRX configuration per PC5 QoS flow. The V2X layer in the UE provides the PC5 DRX configuration to the AS layer for every active PC5 QoS Flow. The AS layer then determines whether to combine the PC5 DRX configuration of all active QoS Flow or switch the UE in "always on" mode.

The UE receives the DRX configuration for sidelink communication over PC5 via NAS signaling from the AMF or the PCF. When the V2X application provides QoS requirements the V2X layer determines PC5 QoS Parameters and PC5 DRX configuration information from V2X configuration information (if available). The V2X layer determines the PC5 QoS Flow (creates new or modifies an existing one) and passes to the AS layer the PC5 QoS requirements and PC5 DRX configuration. The AS layer applies the PC5 DRX configuration and determines Active Time and Offset.

FIG. 1 depicts a wireless communication system 100 for supporting power saving for V2X communications, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In various embodiments, the remote units 105 may communicate directly with each other (e.g., device-to-device communication) using sidelink ("SL") communication signals 109. Here, SL transmissions may occur on SL resources. One example of SL communication is V2X communication. In some embodiments, a remote unit 105 may be provided with different V2X communication resources for different V2X modes. Mode-1 corresponds to a NR network-scheduled V2X communication mode. Mode-2 corresponds to an NR UE-scheduled V2X communication mode. Mode-3 corresponds to an LTE network-scheduled V2X communication mode. Mode-4 corresponds to an LTE UE-scheduled V2X communication mode.

In some embodiments, the remote units 105 communicate with an application server 151 (or other host) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, an Application Function ("AF") 148, a Unified Data Management function ("UDM") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The AF 148 may influence traffic routing, quality of service ("QoS"), quality of experience ("QoE"), and/or charging for specific applications residing on the mobile core network 140. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF")

(which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for supporting power saving for V2X communications apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station/base unit, but it is replaceable by any other radio access node, e.g., gNB, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for supporting power saving for V2X communications.

In some embodiments, a sidelink/V2X UE may derive the V2X DRX based on the active applications running in the UE. Moreover, V2X UEs and negotiate the DRX with other V2X UEs running the same application, according to embodiments of the disclosure.

In some embodiments, the AMF 143 may provide a default PC5 DRX configuration to the UE (i.e., remote unit 105). If the UE determines that the default PC5 DRX configuration cannot be supported based on the QoS requirements of an application, then the UE may determine an offset extending the active time of the DRX to support such QoS requirements.

In various embodiments, a UE (i.e., the remote unit 105) may apply PC5 DRX configuration received within V2X configuration information from an AF or PCF and/or as part of Accepted DRX from the AMF 143. In such embodiments, the UE may receive PC5 DRX configuration information either as: A) a default PC5 DRX configuration from the AMF; or B) PC5 DRX configuration information within V2X configuration information provided by the AF and/or PCF.

According to Option A, the UE applies the default PC5 DRX configuration unless the AS layer determines that QoS requirements cannot be supported. The AS layer in the UE then determines an offset extending the active time of the default DRX configuration. However, according to Option B, the PC5 DRX configuration may be based on V2X service type requested by the application or can be based on QoS requirements or a list of QoS requirements of V2X applications.

In various embodiments, the PC5 DRX configuration included in the V2X configuration information includes a PC5 DRX configuration per PQI or per list of PQI that includes the following: A) a "ran2_offset" that defines at what point in the System Frame Number ("SFN") cycle is the DRX configuration is applied; and B) a DRX cycle configuration.

The V2X layer forwards to the AS layer the PC5 DRX configuration, e.g., by following PC5 QoS Flow derivation as described in 3GPP TS 23.287. When the V2X application provides QoS requirements the V2X layer determines PC5 QoS Parameters and PC5 DRX configuration information from V2X configuration information (if available).

The V2X layer determines the PC5 QoS Flow (creates new or modifies an existing one) and passes to the AS layer the PC5 QoS requirements and PC5 DRX configuration for the QoS flow. The AS layer applies the PC5 DRX configuration and determines Active Time and Offset.

In an alternative embodiment if the V2X configuration information includes PC5 DRX configuration per V2X service type the V2X layer determines the PC5 DRX configuration and forwards it to the AS layer as follows:

The V2X application requests the V2X layer to send a V2X message for a specific V2X service type. The V2X layer determines PC5 QoS Parameters and PC5 DRX configuration information based on the requested V2X service type from V2X configuration information (if available).

The V2X layer determines the PC5 QoS Flow (creates new or modifies an existing one) and passes to the AS layer the PC5 QoS requirements, V2X service type and PC5 DRX configuration for the QoS flow. The AS layer applies the PC5 DRX configuration and determines Active Time and Offset.

Figure 2:
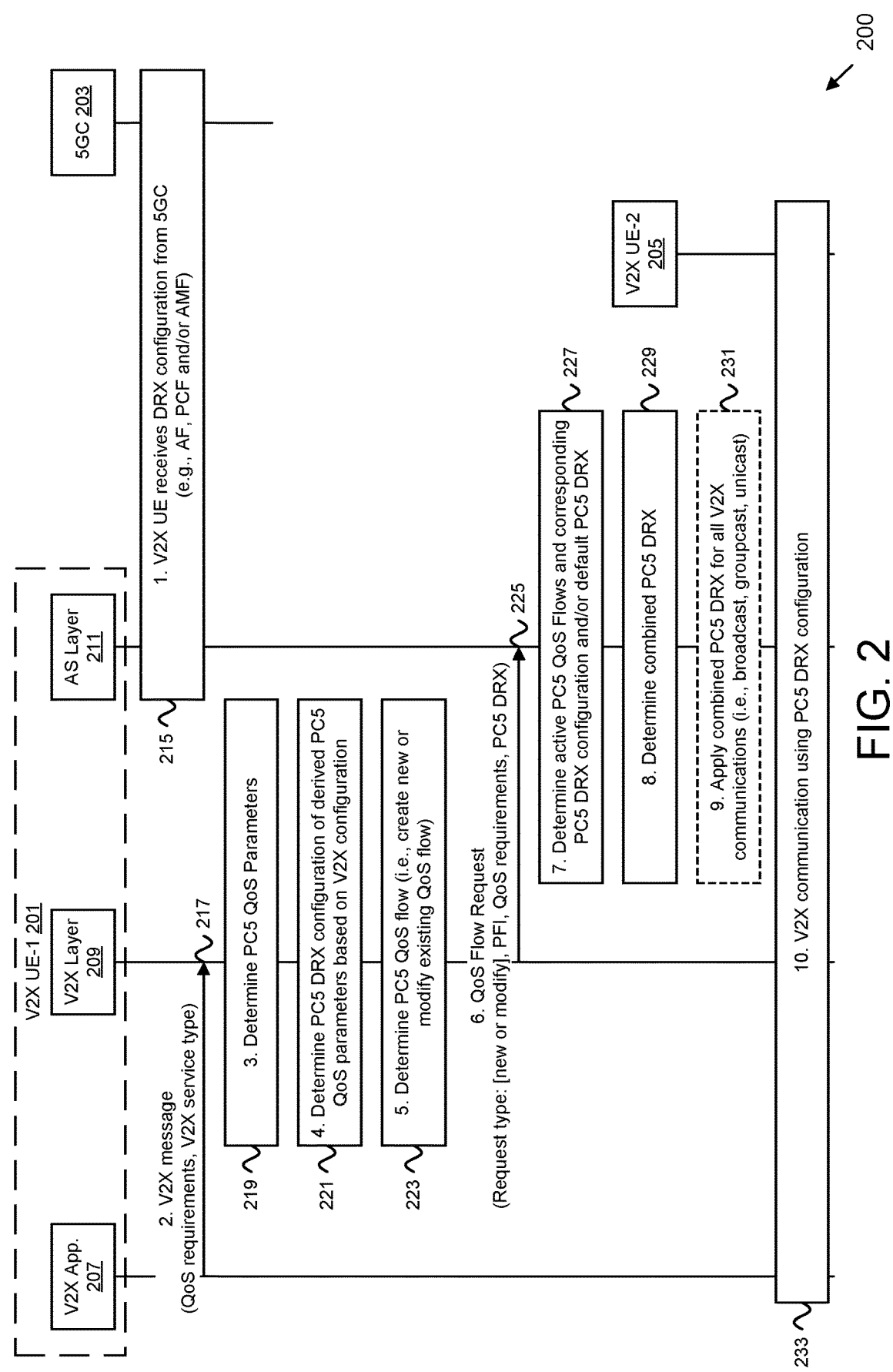
FIG. 2 is a call-flow diagram illustrating one embodiment of a procedure to derive a PC5 DRX configuration for each PC5 QoS Flow.

FIG. 2 depicts an exemplary signaling flow for a procedure 200 to derive PC5 DRX configuration for each PC5 QoS Flow, according to embodiments of the disclosure. The procedure 200 involves a V2X UE (also referred to as "UE-1") 201 that supports sidelink communication over PC5 and one or more network functions in a 5G core network ("5GC") 203 (e.g., AF, PCF, AMF). The V2X UE 201 may also communicate with a V2X UE (also referred to as "UE-2") 205. As depicted, the V2X UE 201 includes a V2X application 207, a V2X layer 209, and an AS layer 211. The AS layer 211 is described in further detail with reference to FIG. 4. The steps of FIG. 2 are described as follows:

At Step 1, the V2X UE 201 receives a PC5 DRX configuration from the 5GC 203 (e.g., from an AF/PCF and/or AMF) (see block 215).

At Step 2, the V2X application 207 provides its application requirements (e.g., in a V2X message) to the V2X layer 209 (see messaging 217). The application requirements include a V2X service type and may also include one or more QoS requirements.

At Step 3, the V2X layer 209 determines the PC5 QoS parameters based on the V2X Application Requirements or uses the default QoS according to the V2X configuration information (see block 219).

At Step 4, the V2X layer 209 determines the PC5 DRX configuration according to the derived PC5 QoS parameters based on the V2X configuration information. In an alternative embodiment the PC5 DRX configuration may be derived according to the V2X service type based on V2X configuration information (see block 221).

At Step 5, the V2X layer 209 determines if an existing or new PC5 QoS Flow is required. If a new PC5 QoS Flow is required, the UE assigns a Packet Flow Identifier (PFI) for this QoS flow and derives PC5 QoS Rules. The PC5 QoS Rules may include the PC5 DRX configuration information (see block 223).

At Step 6, the V2X layer 209 indicates whether a new QoS Flow or modification of an existing QoS Flow is required and provides the QoS requirements and the PC5 DRX configuration information (see messaging 225).

At Step 7, the AS layer 211 determines if there are active PC5 QoS Flows and associated PC5 DRX configuration and/or whether a default PC5 DRX configuration is used, e.g., from the AMF (see block 227).

At Step 8, the AS layer 211 determines if the PC5 DRX configuration can be combined or whether the UE should switch to "always-on" mode, e.g., due to having too many unicast links to benefit from power saving of DRX mode (see block 229).

At conditional Step 9, if the AS layer 211 determines that a combined PC5 DRX configuration can be applied, then the AS layer 211 applies the combined PC5 DRX configuration for all V2X communications, including Broadcast ("BC") V2X communications, Groupcast ("GC") V2X communications, and Unicast ("UC") V2X communications (see block 231).

At Step 10, the V2X UE 201 performs V2X communication with the V2X UE 205 using the PC5 DRX communication (see block 233). As discussed above, the UEs 201, 205 running the same V2X application may negotiate the DRX with each other.

Figure 3:
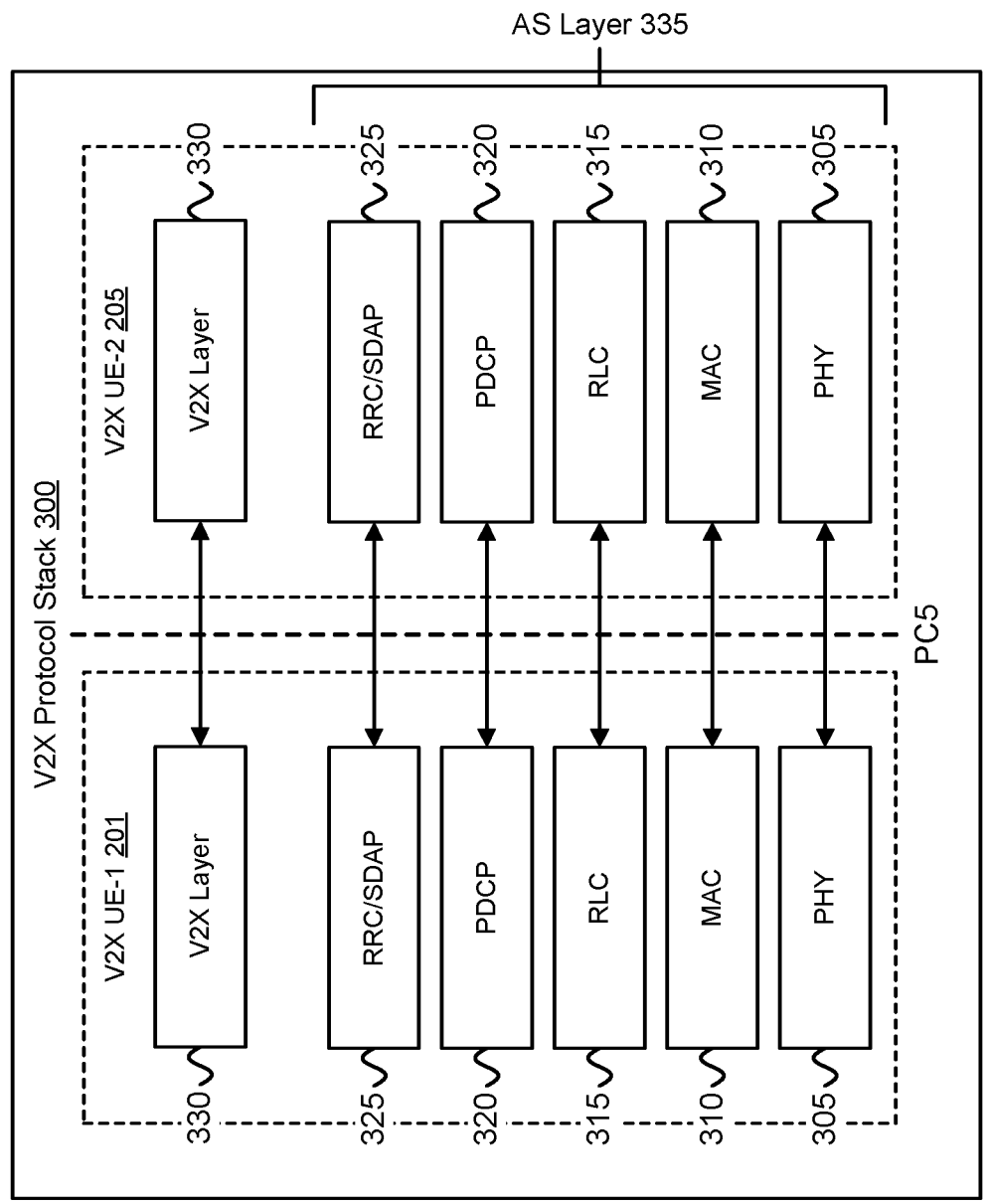
FIG. 3 is a block diagram illustrating one embodiment of a Fifth-Generation ("5G") New Radio ("NR") protocol stack.

FIG. 3 depicts a NR protocol stack 300, according to embodiments of the disclosure. While FIG. 3 shows the V2X UE 201, a RAN node 301 and a 5G core network ("5GC") 203, these are representative of a set of remote units 105 interacting with a base unit 121 and a mobile core network 140. As depicted, the protocol stack 300 comprises a User Plane protocol stack 305 and a Control Plane protocol stack 310. The User Plane protocol stack 305 includes a physical ("PHY") layer 315, a Medium Access Control ("MAC") sublayer 320, the Radio Link Control ("RLC") sublayer 325, a Packet Data Convergence Protocol ("PDCP") sublayer 330, and Service Data Adaptation Protocol ("SDAP") layer 335. The Control Plane protocol stack 310 includes a physical layer 315, a MAC sublayer 320, a RLC sublayer 325, and a PDCP sublayer 330. The Control Plane protocol stack 310 also includes a Radio Resource Control ("RRC") layer 340 and a Non-Access Stratum ("NAS") layer 345. Note that the NAS layer 345 comprises a NAS 5G Mobility Management ("5GMM") sub-layer 365.

The AS layer (also referred to as "AS protocol stack") for the User Plane protocol stack 305 consists of at least SDAP, PDCP, RLC and MAC sublayers, and the physical layer. The AS layer for the Control Plane protocol stack 310 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 340 and the NAS layer 345 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 315 offers transport channels to the MAC sublayer 320. The physical layer 315 may perform a Clear Channel Assessment and/or Listen-Before-Talk ("CCA/LBT") procedure using energy detection thresholds, as described herein. In certain embodiments, the physical layer 315 may send a notification of UL Listen-Before-Talk ("LBT") failure to a MAC entity at the MAC sublayer 320. The MAC sublayer 320 offers logical channels to the RLC sublayer 325. The RLC sublayer 325 offers RLC channels to the PDCP sublayer 330. The PDCP sublayer 330 offers radio bearers to the SDAP sublayer 335 and/or RRC layer 340. The SDAP sublayer 335 offers QoS flows to the 5GC 203 (i.e., UPF 141). The RRC layer 340 provides for the addition, modification, and release of Carrier Aggregation and/or Dual Connectivity. The RRC layer 340 also manages the establishment, configuration, maintenance, and release of Signaling Radio Bearers ("SRBs") and Data Radio Bearers ("DRBs").

The NAS layer 345 is between the V2X UE 201 and the 5GC 203 (i.e., AMF 143). NAS messages are passed transparently through the RAN. The NAS layer 345 is used to manage the establishment of communication sessions and for maintaining continuous communications with the V2X UE 201 as it moves between different cells of the RAN. In contrast, the AS layer is between the Pedestrian UE 201 and the RAN (i.e., RAN node 301) and carries information over the wireless portion of the network.

Figure 4:
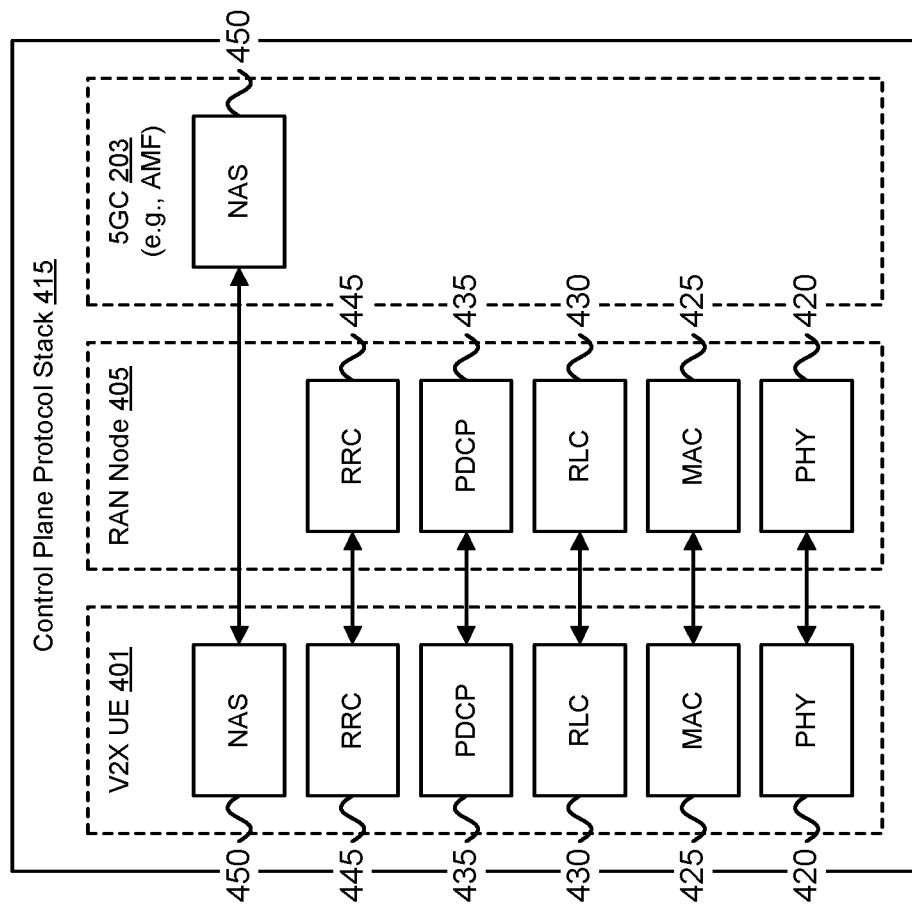
FIG. 4 is a diagram illustrating one embodiment of a V2X protocol stack.
Figure 4:
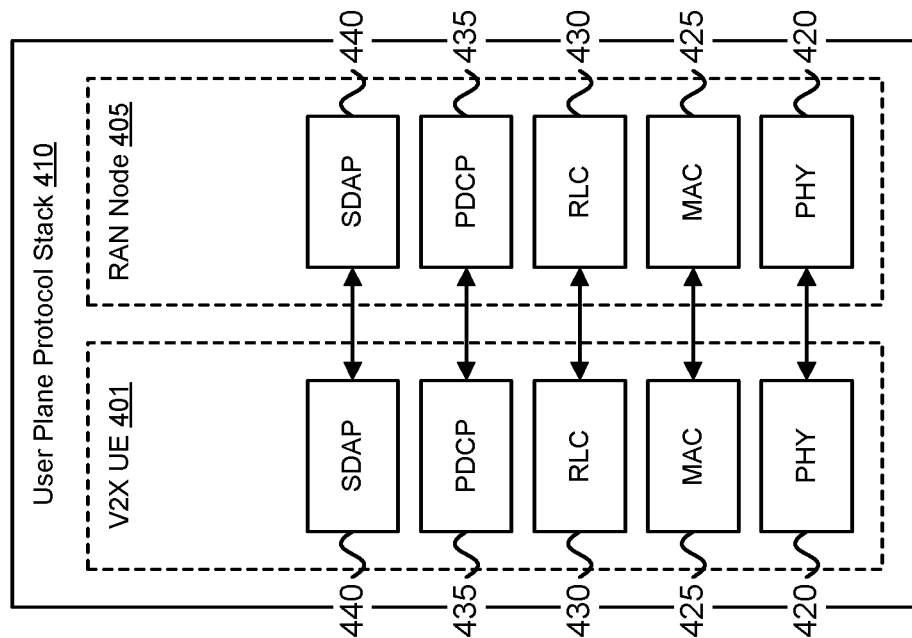

FIG. 4 depicts a V2X protocol stack 400, according to embodiments of the disclosure. While FIG. 4 shows the UE-1 201 and the UE-1 203, these are representative of a set of V2X UEs and other embodiments may involve different V2X UEs. As depicted, the V2X protocol stack (i.e., PC5 protocol stack) includes a physical ("PHY") layer 405 (also known as Layer-1 or "L1"), a MAC sublayer 410, a RLC sublayer 415, a PDCP sublayer 420, and Radio Resource Control ("RRC") and Service Data Adaptation Protocol ("SDAP") layers (depicted as combined element "RRC/SDAP" 425), for the control plane and user plane, respectively. The V2X layer 430 is above the RRC/SDAP layer 425.

The AS layer 435 (also referred to as "AS protocol stack") for the control plane in the PC5 interface consists of at least RRC, PDCP, RLC and MAC sublayers, and the physical layer. The AS layer 435 for the user plane in the PC5 interface consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer and the NAS layer for the control plane and includes, e.g., an Internet Protocol ("IP") layer for the user plane. L1 and L2 are referred to as "lower layers," while L3 and above (e.g., transport layer, V2X layer, application layer) are referred to as "higher layers" or "upper layers."

Similar to the NR protocol stack, the physical layer 405 offers transport channels to the MAC sublayer 410. The MAC sublayer 410 offers logical channels to the RLC sublayer 415. The RLC sublayer 415 offers RLC channels to the PDCP sublayer 420. The PDCP sublayer 420 offers radio bearers to the SDAP sublayer. The SDAP sublayer offers QoS flows to upper layers (i.e., V2X layer 430).

Figure 5:
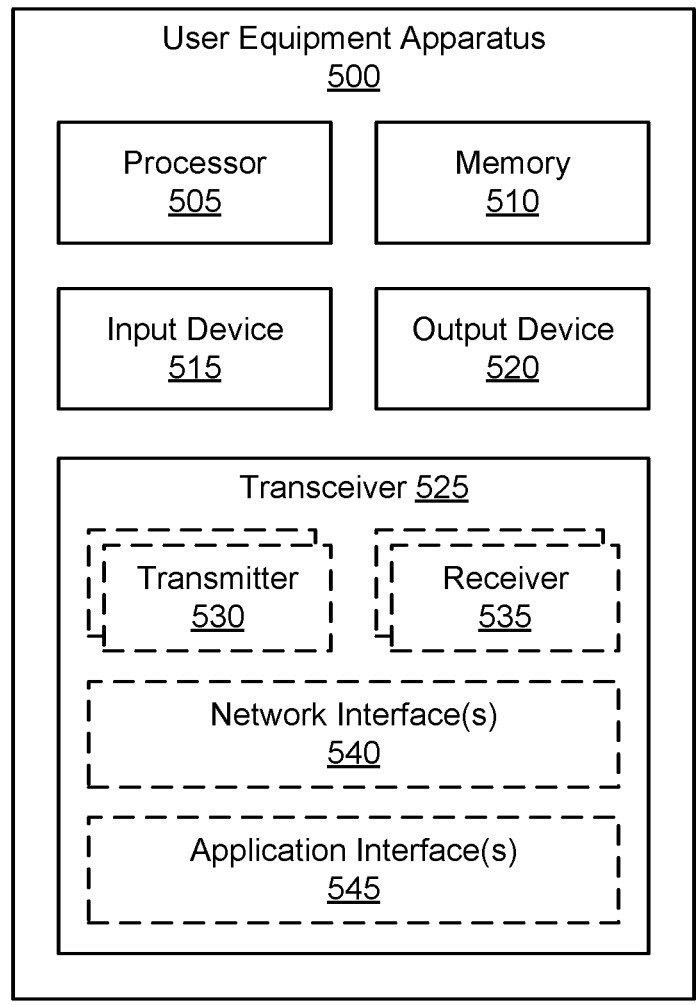
FIG. 5 is a block diagram illustrating one embodiment of a user equipment apparatus that may be used for supporting power saving for V2X communications.

FIG. 5 depicts a user equipment apparatus 500 that may be used for supporting power saving for V2X communications, according to embodiments of the disclosure. In various embodiments, the user equipment apparatus 500 is used to implement one or more of the solutions described above. The user equipment apparatus 500 may be one embodiment of the remote unit 105, the Pedestrian UE 201, and/or the V2X UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panels supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 implements a V2X layer which receives a first request from a first application to send data over a first radio interface, e.g., the PC5/sidelink interface. The processor 505 determines a first PC5 DRX configuration for the first application based on at least one first QoS requirement and determines to establish a first PC5 QoS Flow to transmit the data. The processor 505 associates the first PC5 DRX configuration with the first PC5 QoS Flow and sends a second request to an AS layer to establish a first QoS Flow, where the second request indicates a first QoS parameter and the first PC5 DRX configuration.

In some embodiment, the first request contains the at least one first QoS requirement. In other embodiments, determining the first PC5 DRX configuration based on the at least one first QoS requirement includes using a default QoS requirement to determine the first PC5 DRX configuration in response to the first request not containing any QoS requirement, where the default QoS requirement based on a requested V2X service.

In some embodiments, the processor 505 determines the first PC5 DRX configuration for the first application based on the first QoS requirement by deriving one or more PC5 QoS parameters from the at least one first QoS requirement. In such embodiments, the processor 505 applies the derived one or more PC5 QoS parameters to V2X configuration information to select the first PC5 DRX configuration, where the V2X configuration information contains a PC5 DRX configuration per PC5 QoS indicator.

In certain embodiments, determining to establish a first PC5 QoS Flow to transmit the data includes determining whether an existing PC5 QoS Flow supports the derived one or more PC5 QoS parameters. In such embodiments, the processor 505 determines that a new PC5 QoS Flow is required when there is not an existing PC5 QoS Flow that supports the derived one or more PC5 QoS parameters and derives a set of PC5 QoS Rules for the new PC5 QoS Flow, where the derived PC5 QoS Rules include the first PC5 DRX configuration.

In some embodiments, the determined PC5 DRX configuration contains a DRX cycle configuration and an offset that defines at what point in a SFN cycle the PC5 DRX configuration is applied. In some embodiments, the transceiver receives first configuration information over a Uu interface (i.e., a second radio interface), where the first configuration information includes a set of PC5 DRX configurations. Here, the processor 505 determines the first PC5 DRX configuration from the first configuration information.

In certain embodiments, the first configuration information contains V2X configuration information. In such embodiments, the first configuration information may be received from an AMF, from a PCF, or from an AF. In one embodiment, each PC5 DRX configuration contains a set of parameters per QoS requirement for communication over the PC5 interface. In another embodiment, each PC5 DRX configuration contains a set of parameters per list of QoS requirement for communication over the PC5 interface.

In various embodiments, the processor 505 implements the AS layer. In such embodiments, upon receiving a request to establish a first QoS Flow, the processor 505 determines a set of current active PC5 QoS Flows and their associated PC5 DRX configuration. The processor 505 further determines a combined PC5 DRX configuration that includes the first PC5 DRX configuration information. In certain embodiments, the processor 505 applies the combined PC5 DRX configuration for all V2X cast types.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to supporting power saving for V2X communications and/or mobile operation. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
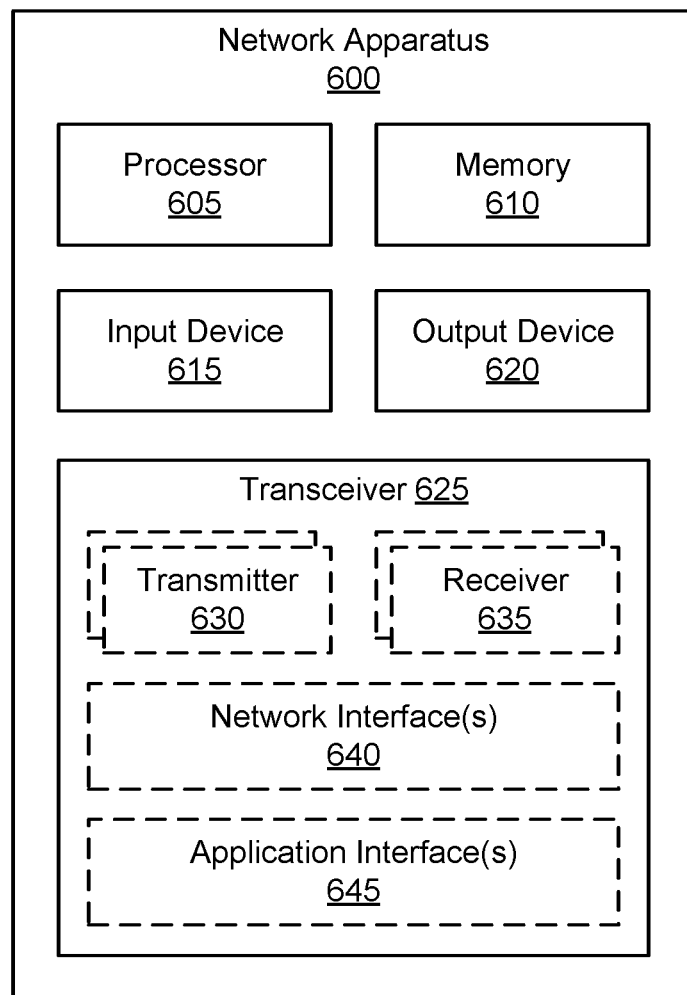
FIG. 6 is a block diagram illustrating one embodiment of a network apparatus that may be used for supporting power saving for V2X communications.

FIG. 6 depicts a network apparatus 600 that may be used for supporting power saving for V2X communications, according to embodiments of the disclosure. In one embodiment, network apparatus 600 may be one implementation of an RAN entity, such as the base unit 121 and/or the RAN node 405, as described above. In other embodiments, the network apparatus 600 may be an implementation of a 5GC network function or EPC network entity, such as the AMF 143, the PCF 147, and/or AF 148. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to supporting power saving for V2X communications. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the Public Land Mobile Network ("PLMN") and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
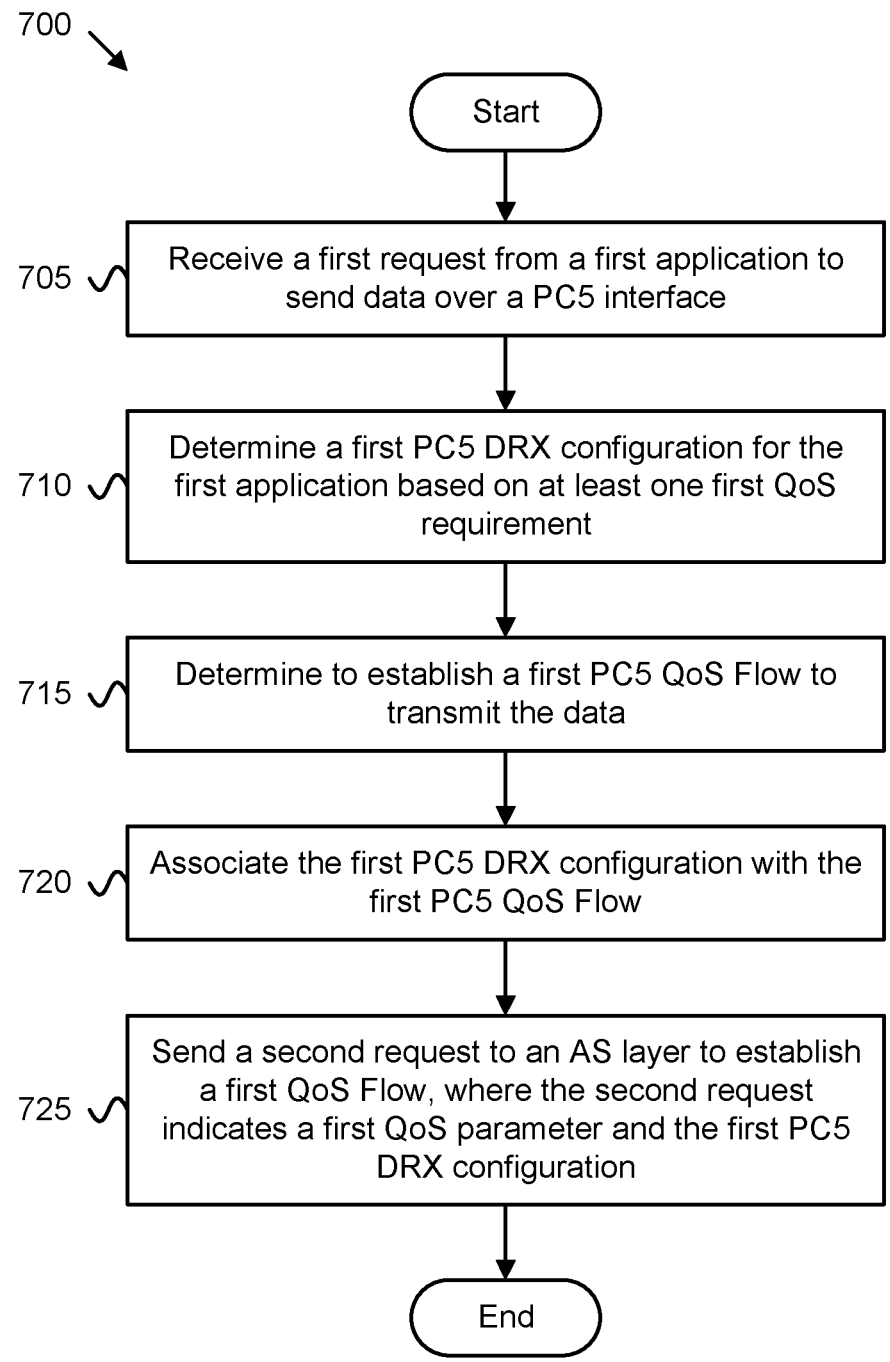
FIG. 7 is a flowchart diagram illustrating one embodiment of a second method for supporting power saving for V2X communications.

FIG. 7 depicts one embodiment of a method 700 for supporting power saving for V2X communications, according to embodiments of the disclosure. In various embodiments, the method 700 is performed by a user equipment device, such as the remote unit 105, the Pedestrian UE 201, the V2X UE 205 and/or the user equipment apparatus 500, as described above. In some embodiments, the method 700 is performed by a processor, such as a microcontroller, a microprocessor, a CPU, a GPU, an auxiliary processing unit, a FPGA, or the like.

The method 700 begins and receives 705, e.g., at a V2X layer of the UE, a first request from a first application to send data over a PC5 interface. The method 700 includes determining 710 a first PC5 DRX configuration for the first application based on at least one first QoS requirement. The method 700 includes determining 715 to establish a first PC5 QoS Flow to transmit the data. The method 700 includes associating 720 the first PC5 DRX configuration with the first PC5 QoS Flow. The method 700 includes sending 725 a second request to an AS layer of the UE to establish a first QoS Flow, where the second request indicates a first QoS parameter and the first PC5 DRX configuration. The method 700 ends.

Disclosed herein is a first apparatus for supporting power saving for V2X communications, according to embodiments of the disclosure. The first apparatus may be implemented by a UE device, such as the remote unit 105, the Pedestrian UE 201, the V2X UE 205 and/or the user equipment apparatus 500, described above. The first apparatus includes a processor, a memory that stores code executable by the processor, and a transceiver implementing a radio interface. The processor (i.e., implementing a V2X layer) receives a first request from a first application to send data over a PC5 interface (i.e., a first radio interface). The processor determines a first PC5 DRX configuration for the first application based on at least one first QoS requirement and determines to establish a first PC5 QoS Flow to transmit the data. The processor associates the first PC5 DRX configuration with the first PC5 QoS Flow and sends a second request to an AS layer to establish a first QoS Flow, where the second request indicates a first QoS parameter and the first PC5 DRX configuration.

In some embodiment, the processor implements a V2X layer which receives the first request from an application layer and sends the second request to the AS layer. In certain embodiments, the first request contains the at least one first QoS requirement. In other embodiments, determining the first PC5 DRX configuration based on the at least one first QoS requirement includes using a default QoS requirement to determine the first PC5 DRX configuration in response to the first request not containing any QoS requirement, where the default QoS requirement based on a requested V2X service.

In some embodiments, the processor determines the first PC5 DRX configuration for the first application based on the first QoS requirement by deriving one or more PC5 QoS parameters from the at least one first QoS requirement. In such embodiments, the processor applies the derived one or more PC5 QoS parameters to V2X configuration information to select the first PC5 DRX configuration, where the V2X configuration information contains a PC5 DRX configuration per PC5 QoS indicator.

In certain embodiments, determining to establish a first PC5 QoS Flow to transmit the data includes determining whether an existing PC5 QoS Flow supports the derived one or more PC5 QoS parameters. In such embodiments, the processor determines that a new PC5 QoS Flow is required when there is not an existing PC5 QoS Flow that supports the derived one or more PC5 QoS parameters and derives a set of PC5 QoS Rules for the new PC5 QoS Flow, where the derived PC5 QoS Rules includes the first PC5 DRX configuration.

In some embodiments, the determined PC5 DRX configuration includes a DRX cycle configuration and an offset that defines at what point in a SFN cycle the PC5 DRX configuration is applied. In some embodiments, the transceiver receives first configuration information over a Uu interface (i.e., a second radio interface), where the first configuration information includes a set of PC5 DRX configurations. Here, the processor determines the first PC5 DRX configuration from the first configuration information.

In certain embodiments, the first configuration information contains V2X configuration information. In such embodiments, the first configuration information may be received from an AMF, from a PCF, or from an AF. In one embodiment, each PC5 DRX configuration includes a set of parameters per QoS requirement for communication over the PC5 interface. In another embodiment, each PC5 DRX configuration includes a set of parameters per list of QoS requirement for communication over the PC5 interface.

In various embodiments, the first apparatus contains/implements the AS layer and, upon receiving a request to establish a first QoS Flow, the AS layer determines a set of current active PC5 QoS Flows and their associated PC5 DRX configuration and determines a combined PC5 DRX configuration that includes the first PC5 DRX configuration information. In certain embodiments, the AS layer applies the combined PC5 DRX configuration for all V2X cast types.

Disclosed herein is a first method for calculating an EVM of a transmitter, according to embodiments of the disclosure. The first method may be performed by a UE device, such as the remote unit 105, the Pedestrian UE 201, the V2X UE 205 and/or the user equipment apparatus 500, described above. The first method includes receiving, at a V2X layer of the UE, a first request from a first application to send data over a PC5 interface (i.e., first radio interface) and determining a first PC5 DRX configuration for the first application based on at least one first QoS requirement. The first method includes determining to establish a first PC5 QoS Flow to transmit the data and associating the first PC5 DRX configuration with the first PC5 QoS Flow. The first method includes sending a second request to an AS layer of the UE to establish a first QoS Flow, where the second request indicates a first QoS parameter and the first PC5 DRX configuration.

In some embodiments, the first request contains the at least one first QoS requirement. In other embodiments, determining the first PC5 DRX configuration based on the at least one first QoS requirement includes using a default QoS requirement to determine the first PC5 DRX configuration in response to the first request not containing any QoS requirement, wherein the default QoS requirement based on a requested V2X service.

In some embodiments, determining the first PC5 DRX configuration for the first application based on the first QoS requirement includes deriving one or more PC5 QoS parameters from the at least one first QoS requirement and applying the derived one or more PC5 QoS parameters to V2X configuration information to select the first PC5 DRX configuration. Here, the V2X configuration information contains a PC5 DRX configuration per PC5 QoS indicator.

In certain embodiments, determining to establish a first PC5 QoS Flow to transmit the data includes determining whether an existing PC5 QoS Flow supports the derived one or more PC5 QoS parameters. In such embodiments, the first method also includes determining that a new PC5 QoS Flow is requires when there is not an existing PC5 QoS Flow that supports the derived one or more PC5 QoS parameters and deriving PC5 QoS Rules for the new PC5 QoS Flow, where the derived PC5 QoS Rules include the first PC5 DRX configuration.

In some embodiments, the determined PC5 DRX configuration includes a DRX cycle configuration and an offset that defines at what point in a SFN cycle the PC5 DRX configuration is applied. In some embodiments, the first method includes receiving first configuration information over a Uu interface (i.e., a second radio interface) and determining the first PC5 DRX configuration from the first configuration information, where the first configuration information contains a set of PC5 DRX configurations.

In certain embodiments, the first configuration information includes V2X configuration information. In certain embodiments, receiving the first configuration information includes receiving said information from one of: an AMF, a PCF, and an AF. In one embodiment, each PC5 DRX configuration contains a set of parameters per list of QoS requirement for communication over the PC5 interface. In another embodiment, each PC5 DRX configuration contains a set of parameters per QoS requirement for communication over the PC5 interface.

In some embodiments, upon receiving a request to establish a first QoS Flow the first method includes the AS layer determining a set of current active PC5 QoS Flows and their associated PC5 DRX configuration and determining a combined PC5 DRX configuration that includes the first PC5 DRX configuration information. In certain embodiments, the first method further includes applying the combined PC5 DRX configuration for all V2X cast types.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment ("UE") apparatus comprising:
a transceiver that supports a PC5 interface; and
a processor that:
receives a first request from a first application to send data over the PC5 interface;
determines a first PC5 Discontinuous Reception ("DRX") configuration for the first application based on at least one first Quality of Service ("QoS") requirement;
determines to establish a first PC5 QoS Flow to transmit the data;
associates the first PC5 DRX configuration with the first PC5 QoS Flow; and
sends a second request to an Access Stratum ("AS") layer to establish a first QoS Flow, wherein the second request indicates a first QoS parameter and the first PC5 DRX configuration.

2. The apparatus of claim 1, wherein the first request comprises the at least one first QoS requirement.

3. The apparatus of claim 1, wherein determining the first PC5 DRX configuration based on the at least one first QoS requirement comprises using a default QoS requirement to determine the first PC5 DRX configuration in response to the first request not containing any QoS requirement, wherein the default QoS requirement based on a requested V2X service.

4. The apparatus of claim 1, wherein determining the first PC5 DRX configuration for the first application based on the first QoS requirement comprises:
deriving one or more PC5 QoS parameters from the at least one first QoS requirement; and
applying the derived one or more PC5 QoS parameters to V2X configuration information to select the first PC5 DRX configuration, wherein the V2X configuration information contains a PC5 DRX configuration per PC5 QoS indicator.

5. The apparatus of claim 4, wherein determining to establish a first PC5 QoS Flow to transmit the data comprises:
determining whether an existing PC5 QoS Flow supports the derived one or more PC5 QoS parameters;
determining that a new PC5 QoS Flow is requires when there is not an existing PC5 QoS Flow that supports the derived one or more PC5 QoS parameters; and
deriving PC5 QoS Rules for the new PC5 QoS Flow, wherein the derived PC5 QoS Rules comprise the first PC5 DRX configuration.

6. The apparatus of claim 1, wherein the transceiver receives first configuration information over a Uu interface, the first configuration information comprising a set of PC5 DRX configurations, each PC5 DRX configuration comprising a set of parameters per QoS requirement for communication over the PC5 interface, wherein the processor determines the first PC5 DRX configuration from the first configuration information.

7. The apparatus of claim 1, wherein the transceiver receives first configuration information over a Uu interface, the first configuration information comprising a set of PC5 DRX configurations, each PC5 DRX configuration comprising a set of parameters per list of QoS requirement for communication over the PC5 interface, wherein the processor determines the first PC5 DRX configuration from the first configuration information.

8. The apparatus of claim 7, wherein the first configuration information comprises Vehicle to Everything ("V2X") configuration information, wherein receiving the first configuration information comprises receiving said information from one of: an Access and Mobility Management Function ("AMF"), a Policy Control Function ("PCF"), and an Application Function ("AF").

9. The apparatus of claim 1, wherein the determined PC5 DRX configuration comprises a DRX cycle configuration and an offset that defines at what point in a System Frame Number ("SFN") cycle the PC5 DRX configuration is applied.

10. The apparatus of claim 1, further comprising the AS layer, wherein upon receiving a request to establish a first QoS Flow the AS layer:
determines a set of current active PC5 QoS Flows and their associated PC5 DRX configuration; and
determines a combined PC5 DRX configuration that includes the first PC5 DRX configuration.

11. The apparatus of claim 10, wherein the AS layer further applies the combined PC5 DRX configuration for all V2X cast types.

12. A method of a User Equipment ("UE"), the method comprising:
receives a first request from a first application to send data over a PC5 interface;
determines a first PC5 Discontinuous Reception ("DRX") configuration for the first application based on at least one first Quality of Service ("QoS") requirement;
determines to establish a first PC5 QoS Flow to transmit the data;
associates the first PC5 DRX configuration with the first PC5 QoS Flow; and
sends a second request to an Access Stratum ("AS") layer to establish a first QoS Flow, wherein the second request indicates a first QoS parameter and the first PC5 DRX configuration.

13. The method of claim 12, further comprising:
receiving first configuration information over a Uu interface, the first configuration information comprising a set of PC5 DRX configurations, each PC5 DRX configuration comprising a set of parameters per QoS requirement for communication over the PC5 interface, and
wherein the first PC5 DRX configuration is determined from the first configuration information.

14. The method of claim 12, further comprising:
receiving first configuration information over a Uu interface, the first configuration information comprising a set of PC5 DRX configurations, each PC5 DRX configuration comprising a set of parameters per list of QoS requirement for communication over the PC5 interface, and
wherein the first PC5 DRX configuration is determined from the first configuration information.

15. The method of claim 12, wherein upon receiving a request to establish a first QoS Flow the method further comprises:
determining, by the AS layer, a set of current active PC5 QoS Flows and their associated PC5 DRX configuration; and
determining, by the AS layer, a combined PC5 DRX configuration that includes the first PC5 DRX configuration.

* * * * *